United States Patent
Hull et al.

(10) Patent No.: US 7,684,007 B2
(45) Date of Patent: *Mar. 23, 2010

(54) ADAPTIVE AND INTERACTIVE SCENE ILLUMINATION

(75) Inventors: Jerald A. Hull, Sandia Park, NM (US); Jonathan J. Gallegos, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 409 days.

This patent is subject to a terminal disclaimer.

(21) Appl. No.: 11/741,207

(22) Filed: Apr. 27, 2007

(65) Prior Publication Data

US 2007/0195270 A1    Aug. 23, 2007

Related U.S. Application Data

(63) Continuation-in-part of application No. 10/924,618, filed on Aug. 23, 2004, now Pat. No. 7,227,611.

(51) Int. Cl.
G03B 19/18 (2006.01)
B60Q 1/00 (2006.01)

(52) U.S. Cl. ........................................ 352/49; 362/465
(58) Field of Classification Search .................. 352/49, 352/198; 396/61; 359/291; 362/459, 465; 340/903
See application file for complete search history.

(56) References Cited

U.S. PATENT DOCUMENTS

| | | | |
|---|---|---|---|
| 4,768,135 A | 8/1988 | Kretschmer et al. | 362/466 |
| 5,499,168 A | 3/1996 | Cochard et al. | 362/466 |
| 5,504,480 A | 4/1996 | Bourbin | 340/903 |
| 5,828,485 A | 10/1998 | Hewlett | 359/291 |
| 5,938,319 A | 8/1999 | Hege | 362/459 |
| 5,969,754 A | 10/1999 | Zeman | 348/136 |
| 6,224,216 B1 | 5/2001 | Parker et al. | 353/31 |
| 6,497,503 B1 | 12/2002 | Dassanayake et al. | 362/465 |
| 6,638,668 B2 | 10/2003 | Buchsbaum et al. | |
| 6,864,473 B2 | 3/2005 | Chretien et al. | 250/201.1 |
| 6,991,336 B2 | 1/2006 | Matsui | 353/94 |
| 6,993,255 B2 | 1/2006 | Braun et al. | 396/61 |
| 7,156,542 B2 | 1/2007 | Miller et al. | |
| 7,227,611 B2 * | 6/2007 | Hull et al. | 352/49 |
| 2003/0047683 A1 | 3/2003 | Kaushai | 250/330 |
| 2004/0037462 A1 | 2/2004 | Lewis et al. | 382/181 |
| 2004/0114379 A1 | 6/2004 | Miller et al. | 362/464 |
| 2005/0275562 A1 | 12/2005 | Watanabe | 340/933 |
| 2006/0039140 A1 | 2/2006 | Magarill | 362/227 |
| 2006/0055896 A1 | 3/2006 | Matsui | 353/94 |

* cited by examiner

*Primary Examiner*—Rodney E Fuller
(74) *Attorney, Agent, or Firm*—Haynes & Boone, LLP.

(57) ABSTRACT

Apparatus for adaptively and interactively lighting a scene includes a digital light projector that includes a light emitter and a digital light processor optically coupled to the emitter such that the emitter light is projected onto respective individual fields of view of a field of regard illuminating the scene in accordance with a projector control signal. A camera adjacent to the projector is operative to detect light reflected or projected from the illuminated scene and generate a signal corresponding to the detected light. A signal processor coupled to the projector and the camera is operative to receive the camera signal, process the received signal into a light projector control signal in accordance with an associated set of instructions, and apply the control signal to the light projector such that the light projected onto the respective individual fields of view of the illuminating array is controlled in accordance with the instructions.

19 Claims, 3 Drawing Sheets

ADAPTIVE AND INTERACTIVE SCENE ILLUMINATION

RELATED APPLICATIONS

This application is a continuation-in-part of U.S. application Ser. No. 10/924,618, filed Aug. 23, 2004, now U.S. Pat. No. 7,227,611, issued Jun. 5, 2007, the entire disclosure of which is incorporated herein by reference.

BACKGROUND

This invention relates to methods and apparatus for controllably illuminating selected objects and areas of a scene in general, and in particular, to methods and apparatus for the adaptive and interactive lighting of such objects and areas, including the establishment of one- or two-way communication of information with such objects and areas.

The term "structured lighting" has been applied to methods and apparatus for optical ranging, or triangulation, in which lines or other patterns of light are projected onto an object, reflected from it, and detected by a camera disposed at an angle relative to the projected light in such a way that certain three-dimensional information about the object, e.g., its shape, distance, size and location, can be determined from the reflected light. (See, e.g., U.S. Pat. No. 6,592,371 to D. Durbin et al.) Such structured lighting techniques have found wide application in certain "machine vision" applications, e.g., robotics, and in manufacturing, in which structured lighting has been used for precision alignment, positioning, and inspection purposes.

In a broader sense, the term structured lighting has also been used to refer to methods and apparatus for selectively illuminating or lighting objects in a field or a scene, such as in architectural lighting, e.g., in museums, and those used in photography and the film and theater arts, to achieve certain desirable lighting objectives, e.g., enhanced visibility, contrast, safety, and dramatic effects. While "adaptive" forms of such prior art structured lighting techniques are known, i.e., the controlled projection of light onto selected objects or portions of a scene based on feedback received from the scene, these tend to be relatively crude and imprecise techniques that require generally static scenes and frequent human intervention, and are not amenable to either the application of modern digital imaging techniques, or to being made "interactive" with objects in the illuminated scene, i.e., enabling the illuminated objects to cooperate, e.g., to communicate, actively or passively, with the lighting system, to affect the projected illumination in a desired way.

For example, it is well known for photographers and film and stage set lighting engineers to measure the light incident upon or reflected from objects in a scene with a light meter, and to then adjust the number, position, color and intensity of a variety of light sources, reflectors and the like in accordance with the measurements taken to obtain the necessary exposure or desired scene lighting effects. It is even possible to "program" the lighting system in a limited sense to accommodate changes in the scene, provided sufficient time is taken between the changes to effect and check the lighting alterations. However, the procedures involved tend to be clumsy, time-consuming, and require the participation of highly skilled lighting technicians. It would therefore be desirable to provide a set lighting system that could, on a real-time basis, adaptively generate and project predetermined levels and colors of illumination onto all of the objects of a dynamic performance scene in accordance with the choreography of the performance.

Another well known example of adaptive lighting involves vehicular headlights. All road-legal vehicles are required to be equipped with headlights for use in the dark, as well as switches for "dimming" the headlights, which are actually used to deflect the beam of the vehicle's headlights downward, so drivers of oncoming vehicles will not be dangerously blinded by the glare of the approaching headlights. This may be effected manually, with a foot- or hand-manipulated switch, or in some vehicles, automatically, by sensors detecting the headlights of the oncoming vehicle, and responsively, effect the dimming switching. However, such systems suffer from a common drawback, namely, while the vehicle's headlights are dimmed, i.e., deflected downward, the driver's visibility of the road ahead is substantially impaired, particularly in low ambient lighting conditions. While adaptive headlight systems have been proposed to overcome this problem by "projecting" a dark spot on only the frontal area of the oncoming vehicle while brightly illuminating the surrounding area, such as described in U.S. Pat. App. Pub. No. 2003/0137849 by R. M. Alden and U.S. Pat. No. 7,156,542 to R. Miller, et al., these suffer from a second problem recognized as inherent in such adaptive headlight systems, viz., if two approaching vehicles are each equipped with such an adaptive system, the operation of both lighting systems becomes unstable, i.e., they both oscillate between bright and dim as the vehicles approach each other. It would therefore be desirable to provide an adaptive, interactive headlight system in which two opposing vehicles, each equipped with such a system, will each experience negligible headlight glare from the other, as well as a "high-beam" illumination of the road ahead.

A long-felt but as yet unsatisfied need therefore exists for adaptive, interactive lighting systems enabling the selective, controllable illumination of the objects and areas of a scene, including the establishment of one- or two-way communication with such objects and areas, amenable to sophisticated digital image processing techniques, and which can be effected automatically and in real time.

BRIEF SUMMARY OF THE INVENTION

In accordance with the exemplary embodiments described herein, adaptive, interactive lighting ("AIL") systems are provided enabling the selective, controllable illumination of objects and areas of a field or scene, including communicating therewith, amenable to sophisticated digital image processing techniques, and which can be effected automatically and in real time.

In one possible exemplary embodiment, the AIL apparatus comprises a digital light projector including a multi-spectral light emitter, means for spatially separating the light emitted by the emitter into a visible portion and an invisible, or non-visible spectrum ("NVS") portion, and a digital light processor (DLP) optically coupled to the light emitter and operative to modulate the invisible portion of the light with an information signal, combine the modulated invisible portion of light with the visible portion of light, and project the combined light onto respective individual fields of view (IFOVs) of a field of regard ("FOR) of the projector so as to illuminate the scene in accordance with a control signal applied to the projector.

The exemplary apparatus further includes a camera disposed adjacent to the projector, operative to detect light either passively reflected or actively projected from the illuminated scene, and to generate a signal corresponding to the light detected, as well as a signal processor coupled to the projector and the camera, and operative to receive the signal generated by the camera, process the received signal into an information signal and a light projector control signal in accordance with an associated set of instructions, and apply the control signal to the light projector in such a way the light projected onto the respective IFOVs of the projector FOR is controlled in accordance with such instructions.

In one possible "analog" embodiment thereof, the camera may comprise a conventional NTSC video camera, e.g., a "Vidicon," and the signal processor may comprise a simple analog video image processor synchronized to the camera. In this embodiment, the instruction set can comprise a simple "reverse video" processing instruction, i.e., one in which objects seen by the camera as white are converted to black, and vice versa, with the resulting signal then being input directly to the video projector, such that the projector "projects" a dark area onto respective portions of the scene brighter than a pre-selected threshold level. The apparatus may further include apparatus for defocusing the light projected by the projector, such that the dark areas projected are somewhat larger than the corresponding portions of the scene onto which they are projected.

In another possible "digital" embodiment, the camera may comprise a digital video camera, e.g., a CCD or CMOS video camera, and the signal processor may comprise a programmable digital video image signal processor synchronized to the camera. In this embodiment, the instruction set may also include an instruction to project a dark area onto respective portions of the scene appearing brighter than a given threshold level, and the size, shape and contrast of the projected dark areas can be controlled by the signal processor and commanded into the projector.

In either of the foregoing embodiments, objects in the illuminated scene may either incorporate, or be provided with, one or more passive light reflectors, or alternatively, with active light emitters, such that the illuminated objects in the scene can provide feedback to or perform full duplex communication with the signal processor, and thereby cooperate, either actively or passively, with the lighting system in a desired way.

In one particularly advantageous embodiment, the projector may spatially separate the light from the emitter into visible and NVS light by means of either a beam splitter or a dichroic filter array, and in the beam splitter embodiment, the modulated invisible portion of light may be combined with the visible portion of light by means of a beam combiner, i.e., another beam splitter operated in reverse. The camera may further comprise apparatus for detecting the NVS light either passively reflected or actively projected from portions of or objects in the illuminated scene. The projected and/or reflected NVS light, invisible to the human eye, provides a medium for the system to communicate interactively and invisibly with the scene containing systems of like kind, or selected objects within it, e.g., with NVS light reflectors disposed on selected objects in the illuminated scene, as above, thereby enabling the system to, inter alia, overcome certain instability problems of prior art adaptive headlight systems.

Additionally, such embodiments may further include apparatus for modulating the NVS light projected by the projector with an information signal, as well as apparatus for demodulating an information signal from the NVS light detected by the camera. The information signal may comprise information about the range, boundary, location and/or identity of the AIL apparatus or an object in the illuminated scene, or alternatively, may comprise voice or data information communicated to and/or received from an object in the illuminated scene, or may simply be a point source beacon.

A better understanding of the above and many other features and advantages of the AIL systems of the present invention may be obtained from a consideration of the detailed description of some exemplary embodiments thereof below, particularly if such consideration is made in conjunction with the several views of the appended drawings, wherein like reference numerals are used to identify like elements illustrated in one or more of the figures thereof.

BRIEF DESCRIPTION OF THE DRAWINGS

FIG. 2 is a simplified schematic illustration of a digital light projector incorporating a digital light processor ("DLP") and a color wheel used to project both visible and invisible light in the exemplary AIL system, shown projecting light onto a single IFOV of an illuminating FOR;

DETAILED DESCRIPTION

Figure 1:
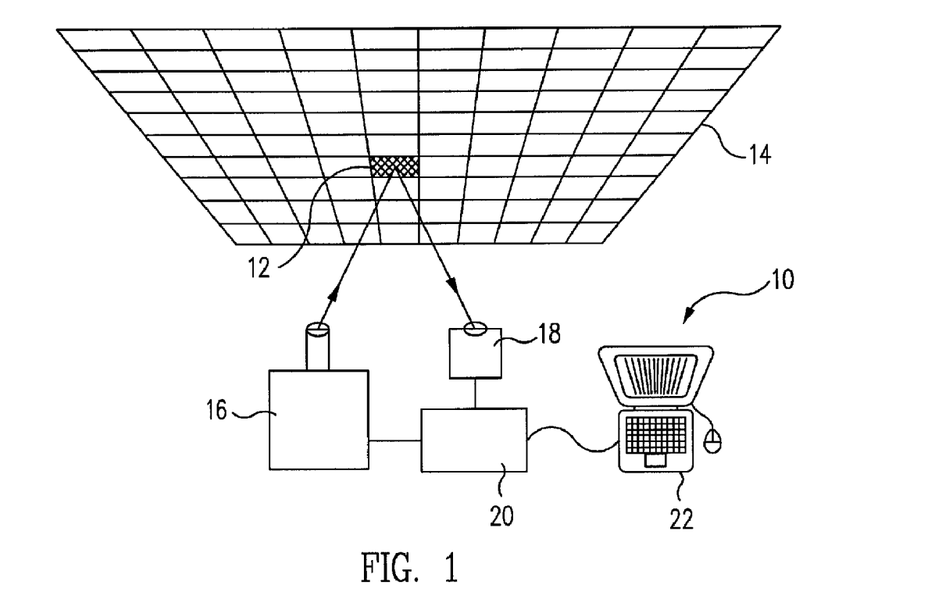
FIG. 1 is partial perspective view of an exemplary embodiment of an adaptive, interactive lighting ("AIL") system in accordance with the present invention, shown projecting light onto a single IFOV of an illuminating FOR encompassing an illuminated scene.

FIG. 1 is partial perspective view of an exemplary embodiment of an adaptive, interactive lighting ("AIL") system 10 in accordance with the present invention, shown projecting light onto an individual field of view ("IFOV") 12 of an illuminating field of regard (FOR) 14 encompassing a field or scene (not illustrated) that is to be illuminated by the system. It should be understood the illuminating FOR 14 is two-dimensional in nature, whereas, the particular field or scene onto which the FOR maps is typically three-dimensional in nature. As illustrated in the figure, the exemplary system comprises an illumination projector 16, an imaging camera 18, and an image processing electronics unit 20, including an image processor, e.g., a digital signal processor ("DSP"). Optionally, the system may also include an associated computer 22, e.g., a laptop computer, for human-interactive programming and/or control of the image processor of the system in real time, as described below.

As used herein, the term "adaptive lighting" means controllably projecting light onto selected portions or objects of a scene based on feedback, i.e., information, received from the scene. The illuminated scene or the objects in it are defined as "interactive" with the AIL system 10 hereof when the objects detected by the camera 18 can cooperate, such as by communicating information, either actively or passively, to the image processing electronics 20 of the system to affect the projected illumination in a desired way. It may be noted, in several of the embodiments described herein, the ability not to project light, i.e., to "project" dark spots, or regions, onto selected objects or areas of the illuminated scene, or to create relatively darker regions within the scene, is considered an important feature of the system, for the reasons discussed below.

Figure 2:
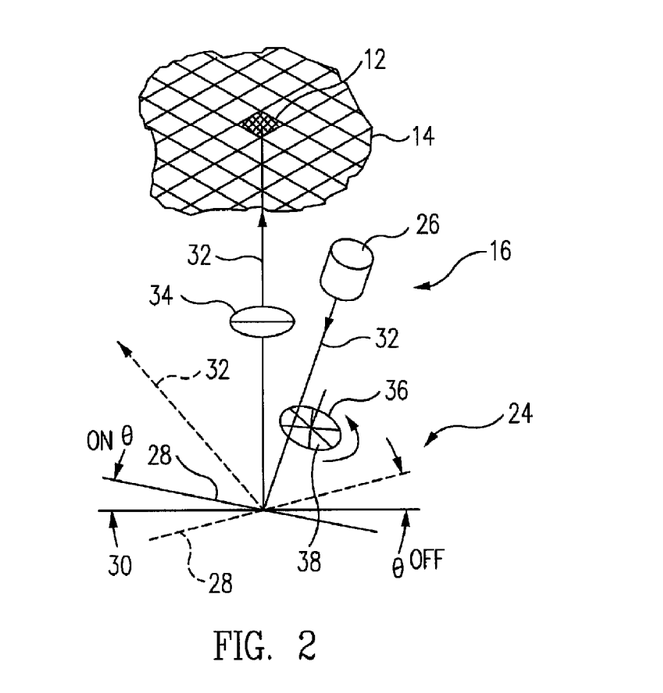

As illustrated in the simplified schematic view of FIG. 2, the projector 16 of the AIL system 10 incorporates a microelectromechanical system ("MEMS") device 24 of a type developed by Texas Instruments for, inter alia, video display projectors, and variously referred to as a Digital Light Processor ("DLP"), Digital Micromirror Device ("DMD"), or Spatial Light Modulator ("SLM") (see, e.g., U.S. Pat. No. 4,710,732 to L. J. Hornbeck). DLP technology enables high brightness, bandwidth, resolution, and contrast, together with spectrally filtered video projection, to be achieved in a relatively inexpensive, compact, reliable and rugged projector design. Widely available, off-the-shelf image processors and algorithms can be used in conjunction with the DLP 24 to process a conventional analog or digital imaging camera output into a signal useful for driving the DLP light projector.

The light projector 16 of the system 10 comprises a light source, or emitter 26, and a DLP 24 optically coupled to the light emitter in such a way that light from the emitter is selectably projected onto respective IFOVs 12 of the projector's FOR 14 illuminating the scene in accordance with the control signal applied to the projector. The DLP 24 itself comprises an array of hinged micro-mirrors 28 that are formed on a silicon substrate using sophisticated semiconductor manufacturing techniques. In the simplified embodiment illustrated in FIG. 2, the DLP includes only a single, hinged mirror 28 for purposes of simple explication, but in an actual DLP, the mirror array comprises many more such mirrors, e.g., arrays of 800 by 1000, 1920 by 1035, or 2048 by 1192 of such micro-mirrors are currently known and commercially available.

Each of the mirrors 28 of the DLP 24 is disposed over a corresponding complementary metal oxide semiconductor ("CMOS") static random access memory ("SRAM") cell (not illustrated). As illustrated in FIG. 2, the mirror is electrostatically biased by the underlying SRAM cell to a horizontal, "neutral equilibrium" position 30, to pivot, in a bistable fashion, between a "latched on" position, $\theta_{on}$ (shown by a solid line), and a "latched off" position, $\theta_{off}$ (shown by a dashed line), by a discrete command addressed to the underlying memory cell during each image processing cycle. As a practical matter, the total angular deflection of the mirror relative to the horizontal position 30 is about ±10°. The discrete commands may be toggled or modulated on and off thousands of times per second, e.g., pulse width modulated, such that the intensity of the light projected onto the corresponding IFOV 12 by the mirror during each video frame can be selectably controlled to conform to one of, e.g., 4, 16 or 256 shades of gray, depending on the on-off modulation duty cycle.

In operation, light 32 from the emitter 26 strikes the hinged mirror 28, and is either reflected from the mirror through the aperture of a projection lens 34 of the projector 16, and thereby projected (shown as a solid line) onto the corresponding IFOV 12 of the illuminating FOR 14, if the mirror is in the "on" position, or is "dumped," i.e., reflected to the side and discarded if the mirror is in the "off" position (indicated by a dashed line). Thus it may be seen the mirror acts to pulse-width-modulate the light incident upon it from the emitter 26 such that the intensity of light projected by the projector 16 onto the corresponding IFOV of the projector's FOR can be controllably varied during each processing cycle from a completely "off" level, i.e., full black, to a completely "on" level, i.e., full bright, over a range of gray scale values determined by the mean on-time of the mirror during each image processing cycle.

In addition to the DLP 24 and the light emitter 26, the projector 16 of the system 10 may also comprise a rotating "color filter wheel" 36 of a known type, the rotation of which is synchronized with the image processing cycles of the DLP. The color wheel may include sections 38, e.g., red, green, blue, or clear, that filter the light passing through the wheel such that light of a selectable color, or spectral content, can be projected by selected ones of the mirrors of the DLP onto their corresponding IFOVs 12 of the illuminating FOR 14 of the projector. Additionally, the color filter wheel can advantageously include filter sections that pass only light in a non-visible spectrum ("NVS"), invisible to the human eye, such that the DLP can project NVS light onto all or selected ones of the IFOVs of the illuminating FOR in addition to, or independently of, the visible light being projected thereon. As described below, this feature enables a covert communication link to be established between the AIL system 10 and another, similarly configured system useful for a number of purposes.

While the above "color wheel" projector 16 embodiment of FIG. 2 is capable of functioning with reasonable reliability when operating in stationary ambient conditions, such as in a studio, the reliability of the rotating parts of a color wheel 36 can be substantially reduced in an environment including the harsh combination of mechanical vibration and thermal cycling, such as are found in, e.g., an aircraft or motor vehicle.

Additionally, it will be appreciated that the color wheel 36 is capable of spectrally modulating only a single source beam of light 32. This means, for every time period of revolution of the color wheel, part of that period is spent providing only NVS illumination, while the remainder of the period provides only visible illumination. Consequently the time-averaged intensity of the visible illumination of the projector 16 is reduced in proportion to the non-visible intensity thereof. Accordingly, a projection apparatus 16 using a color wheel 36 is less "light-efficient" than one that simultaneously spectrally separates visible and non-visible light beams from a single beam light source, spatially alters the intensity of either or both beam paths, if desired, then recombines the beam paths into a coaxial beam path and projects the combined beam through imaging optics and onto a scene 14, such as the two alternative exemplary embodiments described in more detail below. Both embodiments define a projection source for illuminating a scene 14 with multi-spectral light, such as both visible and non-visible light, which is spatially modified at exactly the same time, with no moving parts being required, other than the multitude of micro-mirrors 28 included in the DLP 24.

Figure 3:
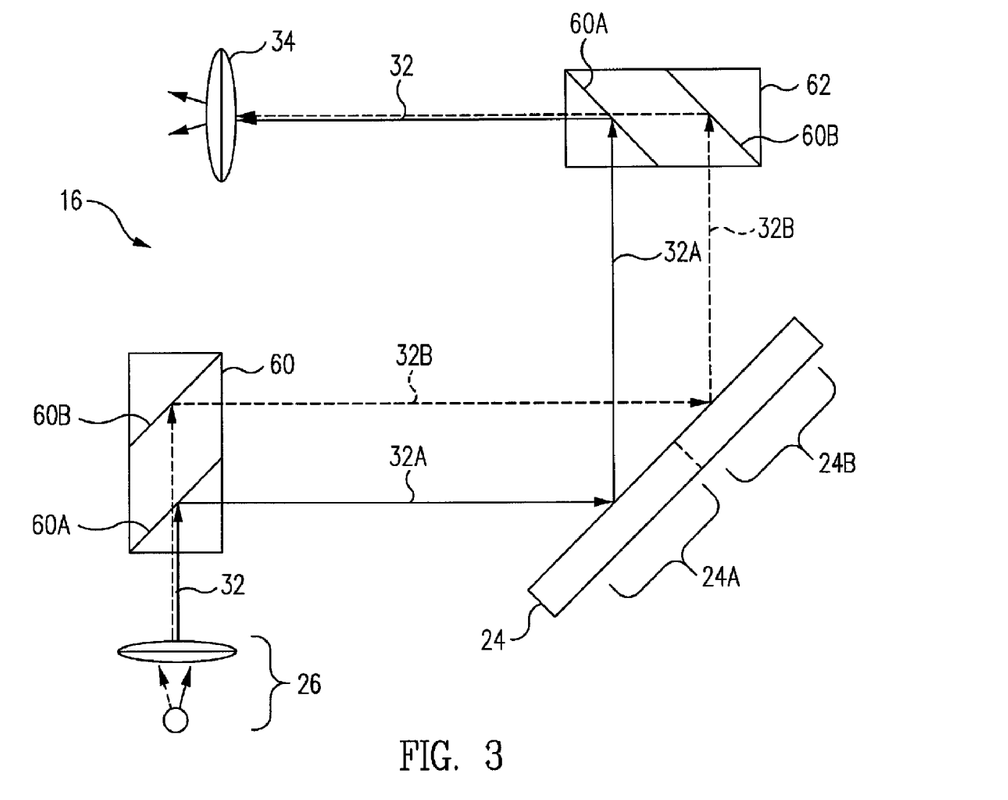
FIG. 3 is a simplified schematic illustration of an alternative embodiment of the projector of the exemplary AIL system incorporating a beam splitter and a beam combiner in place of the color wheel of FIG. 2.

FIG. 3 is a schematic illustration of a first alternative exemplary embodiment of the light projector 16 of the AIL system 10 of FIG. 1, which incorporates a beam splitter 60 and a beam combiner 62 in place of the color wheel 36 of FIG. 2. A beam splitter is an optical device that splits a beam of light into two components, and in the particular exemplary embodiment illustrated, comprises a first surface 60A that reflects (or refracts) a portion 32A (e.g., the visible portion) of the light 32 incident upon it from a collimated light source 26, and allows a second portion 32B (e.g., the NVS portion thereof) to pass therethrough, and a second surface 60B disposed behind the first surface 60A that reflects or refracts the NVS portion 32B in a direction parallel to, but spatially separated from, the first, visible portion 32A. The first reflective/refractive surface 60A may comprise, for example, an interface between a pair of prisms, or alternatively, a "half-silvered" mirror, or one having a dichroic optical coating thereon, and the second reflective/refractive surface 60B may comprise one that simply reflects or refracts substantially all of the NVS light 32B incident thereon. Additionally, it should be noted that the "beam combiner" 62 is identical to the beam splitter 60 in construction, but with the respective directions of the incident and reflected/refracted light beams 32, 32A and 32B being reversed from those shown for the beam splitter 60.

The segregated beams 32A and 32B from the beam splitter 60 are respectively projected onto separate DLPs 24A and 24B, or alternatively, onto separate, dedicated sections 24A and 24B of a single DLP 24. Reflections off of the micro-mirrors 28 of the DLP while they are in the "on" position are then recombined in the beam combiner 62 (i.e., a reversed beam splitter 60), coupled into imaging optics 34 and projected thereby onto a scene 14. The portion 24B of the DLP(s) 24 exposed to the NVS band is operative to time-modulate the light coupled to the scene so as to provide, e.g., light communication channels between the projector and the scene, in the manner described below. As in the exemplary embodiment of FIG. 2 above, when the DLP mirrors 28 are in the 'off' position, the reflections therefrom are collected in a "beam dump" (not illustrated), and in this regard, it should be noted that the first beam splitter 60 may therefore also be used advantageously to dump bands of light of a longer wavelength, thereby reducing the amount of radiant heat coupled from the light source 26 to the DLP 24.

Figure 4:
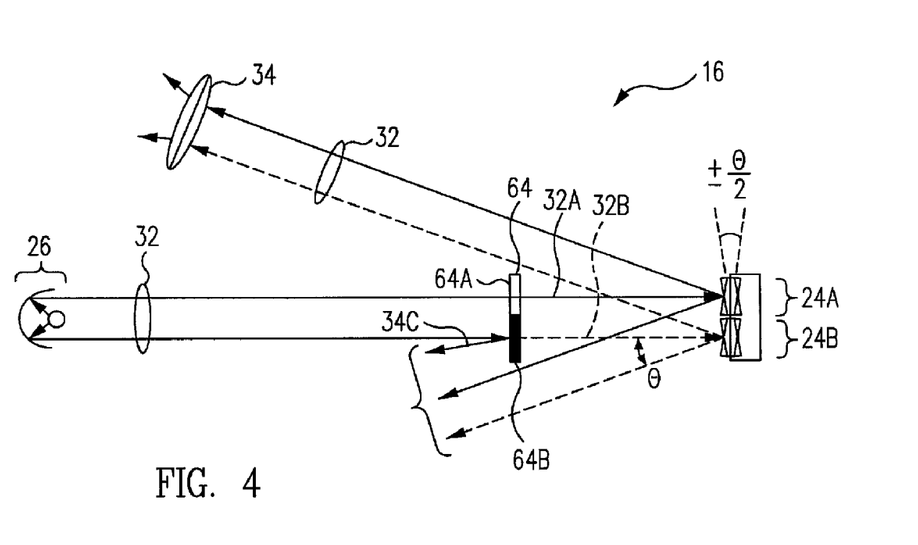
FIG. 4 is a schematic illustration of another alternative embodiment of the projector of the exemplary AIL system incorporating a dichroic filter array in place of the color wheel of FIG. 2; and, FIG. 5 is a schematic perspective illustration of the operation of an exemplary adaptive interactive vehicle headlight system in accordance with the present invention.

FIG. 4 is a schematic illustration of another possible alternative embodiment of the projector 16 of the exemplary AIL system 10, which incorporates a dichroic filter array 64 in place of the color wheel 36 of FIG. 2. A dichroic filter passes light of a selected range of colors or wavelength, and reflects light having colors not falling within that range. An array 64 of such filters in the form of a matrix or a mosaic, such as described in, e.g., U.S. Pat. No. 6,638,668 to P. Buchsbaum, et al., can be confected in which each of the individual filters is dedicated to a respective one (or group) of the micromirrors of a DLP 24. For purposes of simplicity, in the particular exemplary embodiment illustrated in FIG. 4, the dichroic filter array 64 comprises only two dichroic filters 64A and 64B, each corresponding to a respective one of the two micro-mirrors 24A and 28B of a DLP 24, but in other possible embodiments, the filter array and DLP may respectively have a substantially larger number of corresponding filters and micro-mirrors.

Thus, in the second alternative projector 16 embodiment of FIG. 4, the dichroic filter array 64 has a "pixel" pitch and array size appropriately aligned and coupled to the DLP 24, and is operative to segregate a light beam 32, or even multiple light beams, into a single light "source" for each individual pixel, e.g., respectively white and NVS light sources 32A and 32B, spatially separated from each other and incident onto a corresponding one (or group) of the micro-mirrors 24A and 24B of the DLP 24.

As illustrated in FIG. 4, the dichroic filters 64A are effective to pass all of the multi-spectral light 32 incident thereon from the light source 26, whereas, the dichroic filters 24B reflect all but the NVS portion of the incident light. The rays 32C of the visible light reflected off the dichroic filters 64B are collected in a beam dump (not illustrated). The light rays 32A and 32B that reflect off respective ones (or groups) of the DLP mirrors 24A and 24B that are in the "on" position are then coupled to imaging optics 34 and projected thereby onto a scene 14. Those portions of the DLP(s) exposed to the NVS light 32B function to time-modulate the light coupled to the scene so as to provide, e.g., covert light ranging and/or information communication channels between the projector 16 and the illuminated scene 14. Reflections off of the DLP mirrors 24A and 24B while in the "off" position are, as in the first and second embodiments of FIGS. 2 and 3 above, collected in the beam dump. As in the above embodiments, a dichroic filter array 64 may also be used to dump bands of light of longer wavelengths, thereby reducing the amount of radiant heat coupled from the light emitter 26 to the DLP 24.

As those of skill in the art will appreciate, the "beam splitter" embodiment of FIG. 3 is more light efficient than the "dichroic filter array" embodiment of FIG. 4, but contains more parts, i.e., two beam splitter assemblies 60 and 62, versus one dichroic filter array 64. Compared to the embodiment of FIG. 4, the embodiment of FIG. 3 also requires additional DLP mirrors or a reduced field of regard of the projected image.

Other possible projector 16 embodiments of the AIL system 10 may be used to effect simultaneous spectral separation of visible 32A and non-visible light beams 32B from a single or multiple beam 32 light emitter 26, including combining multiple light sources, including Light Emitting Diodes (LEDs), with one or more combinations of dichroic filter arrays 64, beam splitters 60, DLPs 24 and even Liquid Crystal Displays (LCDs), to accomplish the desired combined affects of spectrally, spatially and temporally modulated illumination imaged onto a scene 14.

Existing and prior art solutions directed to adaptive illumination systems are typically of two types: Imaging and non-imaging, and of two sub-types: Single light source and multiple light sources. Imaging systems are necessarily focused, and require precision optical surfaces and stable alignments. Non-imaging systems are not focused, and allow for the use of diffuse optical surfaces with relatively loose optical alignments. Imaged systems are capable of illuminating a scene with high spatial contrast. Non-imaging systems provide floodlight-like illumination with little or no spatial contrast. Imaging systems are therefore more costly than non-imaging systems but can provide more spatial contrast, where needed.

Single light source systems can be implemented in both imaging and non-imaging systems. Single source imaging systems allow for a single train of imaging optics. Xenon High Intensity Discharge (HID) headlights constitute one example thereof. Multiple light source systems can also be implemented in both imaging and non-imaging systems. Significant development efforts are currently underway to define both types of systems implementing "white" LEDs. However, since white LED's are currently not nearly as luminous as incandescent sources, white LEDs must be combined in arrays. An array of LEDs is relatively easy to implement in a non-imaging system that provides floodlight-like illumination but is currently not easily embodied to provide structured illumination. Currently, a DLP 24 coupled to a single incandescent source 26 can provide millions of pixels of spatial resolution. While LEDs are more efficient in converting electrical current to white light than incandescent light sources, internal heat generated from each LED must be conducted away, making it currently impractical to package a large number of LED's within a relatively small volume. Thus, although preferred embodiments of the AIL systems 10 of the present invention define imaging systems with a single light source 26, it should be understood that embodiments implementing LEDs, including laser diodes, either singly, or disposed in arrays thereof, are not excluded therefrom.

AIL Vehicle Headlights

Figure 5:
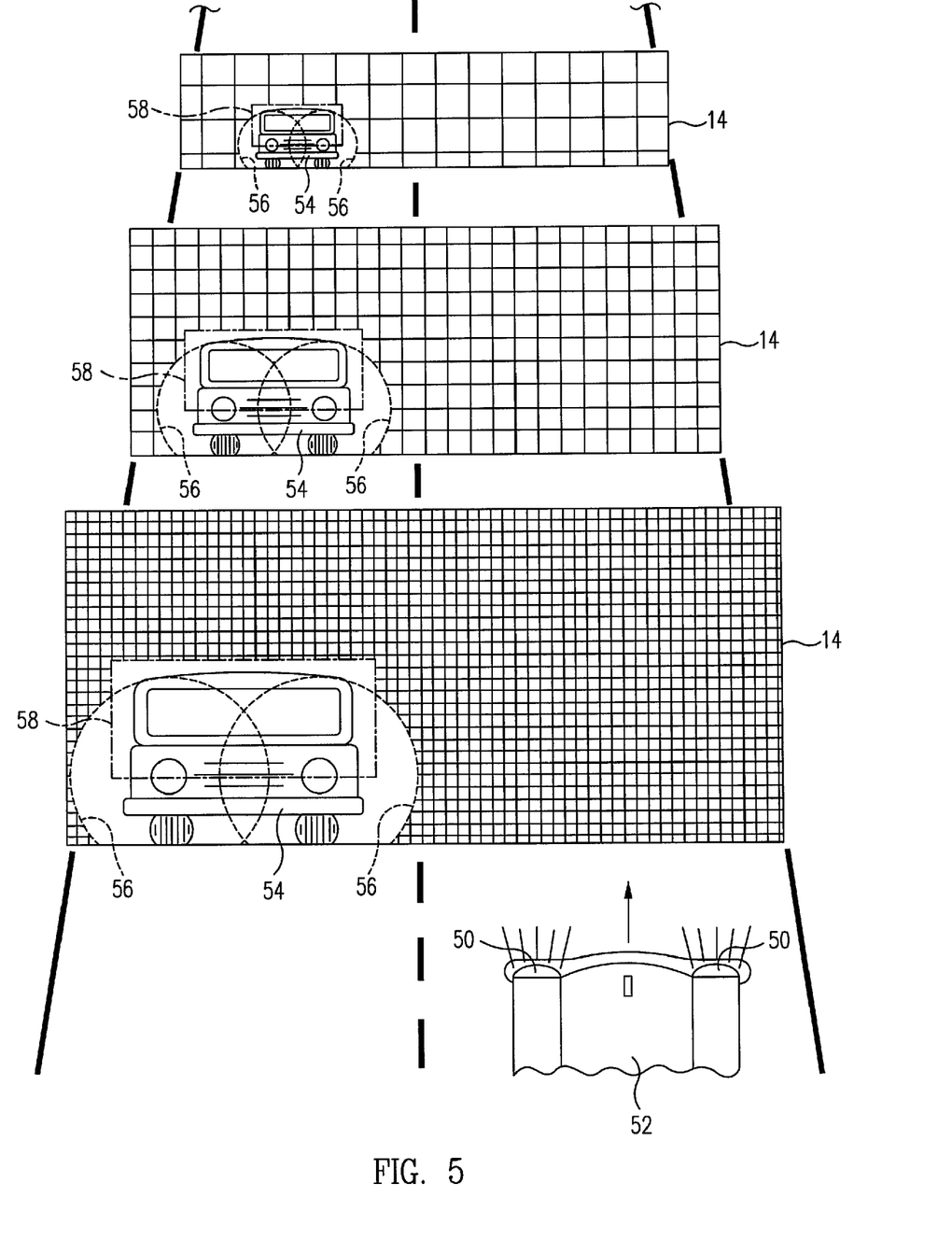

As will be appreciated by those of skill in the art, there are numerous practical applications of the AIL system 10 of the present invention. As illustrated in FIG. 5, one of these relates to adaptive automotive headlights and taillights. The demand for AIL illumination systems in the commercial automotive market has increased dramatically with the introduction of so-called High Intensity Discharge ("HID") headlights presently found in many luxury cars. Recent changes in regulations of the Economic Commission for Europe attempt to address a rash of public complaints over the perceived annoyance of HID headlights caused by their glare.

In the U.S., a number of studies have also been conducted in response to an increasing public interest in the problem of vehicle headlight glare. Reports from these studies discuss the virtues and technical challenges of several technologies, including adaptive headlights. In 2003, the National Highway Transportation Safety Administration conducted an in-depth study addressing public concern over headlight glare. The study determined the primary causes of concern, and concluded with a recommendation to commission a study to determine whether adaptive headlights can reduce glare.

The AIL headlight system of the present invention described below can satisfy not only the new European regulations intended to reduce headlight glare to oncoming drivers, but can also substantially increase the road visibility of the driver of a vehicle equipped with such a headlight system. The combination of these advantages can result in a substantial reduction of nighttime traffic fatalities and property damage.

As illustrated in FIG. 5, AIL illumination systems 10 of the type described above in conjunction with FIGS. 1 and 2 can be implemented as the headlights 50, tail lights (not illustrated), and even visible or invisible "communication" lights of military and commercial vehicles. In general, the AIL headlights 50 of the subject vehicle 52 sense the illumination from the headlights of an oncoming vehicle 54, shown at three stages during its approach to the subject vehicle, and responsively, paint a dark spot 56 over the frontal area of the oncoming vehicle that is large enough to encompass the eyes of the occupants of the oncoming vehicle, in one of two possible embodiments, as described below.

In one possible "analog" embodiment, each of the headlights 50 of the subject vehicle 52 comprise an AIL system 10 of the type described above and illustrated in FIG. 1, i.e., a video projector 16 that illuminates a FOR 14 encompassing the road ahead of the vehicle, including the oncoming vehicle 54, a camera 18, and a video image processor 20. In this adaptive headlight embodiment, the camera of each headlight may comprise a conventional analog or digital video camera, e.g., a "Vidicon" or a CCD video camera, and the signal processor may comprise a conventional, widely available analog video image processor. And, while the DLP 24 of the projector is inherently digital in nature, this can be accommodated by the provision of a suitable analog-to-digital ("A/D") converter (not illustrated) disposed between image processor and the projector.

In the analog embodiment of the system, the instruction set of the image processor can comprise a simple, well-known "reverse video" processing instruction, i.e., one in which the camera video output is "color inverted," such that objects in the illuminated scene seen by the camera as white are converted to black, and vice versa, and then input directly to the video projector as a control signal. The AIL headlights 50 thus each projects a "dark spot" 56 (shown by dashed line circles of FIG. 3) onto respective portions of the illuminating FOR 14 projected onto the road ahead appearing brighter than a given threshold level, i.e., over each of the headlights of the oncoming vehicle 54, as illustrated in the figure. Further, since it is desirable the headlights 50 be capable of accommodating oncoming vehicles of various sizes, the light output of each headlight can be slightly defocused with the projection lens 34 (FIGS. 2-4), such that the dark spots 56 projected are dilated, i.e., made slightly larger than, the corresponding portions of the scene onto which they are projected, i.e., the headlights of the oncoming vehicle, thereby dimming or "blanking out" those portions of the frontal area of the oncoming vehicle including the occupants' eyes. The analog embodiment can thus be used advantageously to achieve the adaptive headlights application described herein using conventional, off-the shelf, analog video processing components and techniques.

In a second, "digital" embodiment, either or both of the camera 18 and the video image processor 20 of the headlights can comprise fully digital components, e.g., a charge-coupled-device ("CCD") or a complementary metal oxide semiconductor ("CMOS") video camera, and a digital signal processor ("DSP") of known types, respectively. While digital processing techniques are typically more complex, and hence, more expensive to implement, than simple analog reverse video techniques, they also provide substantial additional capability and flexibility in the selective illumination of a scene. Digital processing can not only perform the above reverse video function, but many others as well, and can do so with enhanced brightness, contrast and specialized transition effects between illuminated areas and the projected dark areas. For example, in the adaptive headlights 50 example above, a digital system can eliminate the diffusing apparatus required of the analog system, and instead, paint a dark rectangular area 58 (shown by the phantom outline in FIG. 5) precisely overlaying the windshield area of the oncoming vehicle 54 in accordance with a "template" programmed into the DSP.

Thus, in either of the analog or the digital embodiments of the adaptive headlights 50 described above, the driver of the vehicle 52 equipped with the adaptive system gains the benefit of a "high-beam" illumination of the area 14 surrounding the oncoming vehicle 54, without projecting a blindingly dangerous headlight glare onto the occupants of the oncoming vehicle.

An important consideration that must be taken into account in any headlight dimming application of AIL is, if two opposing vehicles are each equipped with such an adaptive headlights system 50, the benefit to the respective drivers of both vehicles is maximized, i.e., each will obtain negligible glare from, and a high-beam illumination of, the other. However, if both vehicles 52 and 54 of FIG. 3 were equipped with such adaptive headlight systems, then an inherent drawback of such systems will necessarily be encountered, viz., that if two approaching vehicles are both equipped with such an adaptive system, and without more, the operation of both headlight systems will become unstable, i.e., they will both oscillate disconcertingly between bright and dim as the two vehicles approach each other.

This instability pattern results because, as one vehicle's headlights are perceived by the other to dim, the other system stops detecting the headlights of the first system, and therefore, stops "blanking" the other, and vice versa, in a rapidly alternating fashion, as the two vehicles approach each other. The oscillation may be thought of as the unstable result of two interacting feedback control systems with no observability. What is needed to eliminate this instability is a mechanism enabling the two systems to communicate with each other. Each system thus requires controllability and observability of its dark spot to maintain stable performance. In the case of two opposing adaptive systems, each adaptive system has the ability to control the projected dark spot in the direction of the other adaptive system. However, neither system can truly observe the dark spot that it is trying to control. The assumption that the reverse video image of the other headlight's intensity is a measure of the dark spot is no longer valid when the other system alters that intensity.

It has been discovered that the above instability problem can be overcome in the AIL headlight system of the present invention in several possible ways. In one advantageous embodiment, the headlights 50 may be equipped with a light projector 16 incorporating a color filter wheel 36, a beam splitter/beam combiner 60, 62, or a dichroic filter array 64 of the types respectively described above and illustrated in FIGS. 2-4, capable of filtering out all but the NVS light projected from the headlights 50 onto selected portions of the illuminating FOV 14. In this embodiment, the image processor 20 can be programmed to continue to project NVS light onto the blanked-out portion of the oncoming vehicle 54, and further, to detect any NVS light passively reflected or actively projected from the oncoming vehicle. Thus, while the visible portion of the light projected by each of the two oncoming vehicles on the other will become dimmed or invisible to the other, each will continue to "see" the NVS light projected by the other, and will thus continue to "blank" the other, so long as that NVS light is seen.

In another possible embodiment, the AIL headlight system 50 of the vehicle 52 can comprise apparatus for modulating the projected NVS light with an information signal, in a known manner, e.g., by spectral frequency, temporal frequency, amplitude or phase modulation techniques, or a combination of such techniques, as well as apparatus for demodulating an information signal from the NVS light detected by the camera 18 of the system, again, in a known manner. In this embodiment, the information signal modulated onto the NVS light "carrier" can comprise information regarding the speed, distance, boundary and location of the projecting vehicle, such that the vehicle effectively "announces" itself and, e.g., the size or boundary of its frontal area, to the other AIL system. It may be seen that, in such an embodiment, a form of a communication link is established between the respective headlight systems of the two vehicles in which the camera of one vehicle is used to control the light projected by the headlight system of the other system, and vice-versa, thereby overcoming any instability problem in the two systems, and enabling the maximum AIL lighting benefit to be achieved by the drivers of both vehicles. As will be appreciated by those of skill in the art, tail lights, and even side lights, can also be confected that output a NVS light pattern to control the rearview and side glare from a following or approaching vehicle equipped with such an AIL headlight system.

In yet another variation in which the oncoming vehicle 54 is not equipped with AIL headlights, or in which it is not facing the subject vehicle 52, e.g., as in the case of a vehicle approached from the side, it is still possible for the first vehicle (or another type of object, such as a pedestrian) to passively interact with the AIL headlights of an approaching vehicle, by providing the first vehicle with one or more NVS light reflectors disposed, e.g., at its margins. These reflectors may comprise special paints or trim items that integrate aesthetically with the vehicle. In such a scenario, the approaching vehicle's AIL headlights can be programmed to recognize its own projected NVS light signal reflected back from the first vehicle, construct an appropriate blanking template, and superimpose the template over the projected illumination of the first vehicle, thereby eliminating the glare of the approaching vehicle's headlights on the first vehicle (or other illuminated object). Alternatively, the passive reflectors can be configured to encode the reflected, or "back-scattered," NVS light with limited information, such as vehicle type, or, in an Identification Friend or Foe ("EFF") application, the identity of the targeted vehicle, in a manner analogous to a LTPC bar code or an RFID label.

As will also be appreciated, the communication link described above that AIL systems can easily establish between two such systems can be extended to meet other information communication objectives. For example, AIL headlight- and/or taillight-equipped military vehicles can communicate with each other in covert situations using the NVS light spectrum capability of the AIL headlights 50 described above, in which voice and/or data can be used to modulate, and be demodulated from, the projected NVS light carriers, to effect, e.g., broadcast, half-duplex, or even full duplex communications between the vehicles.

As will by now be evident to persons of skill in this art, many modifications, substitutions and variations can be made in and to the materials, components, configurations and methods of implementation of the AIL illumination system 10 of the present invention without departing from its spirit and scope. Following are several examples of such practical applications of the system that can be achieved with such modifications, substitutions and variations.

Cooperative Floodlighting

Cooperative floodlighting applications of AIL include support of military engagements, fighting urban crime, performing search and rescue missions, and illuminating a path with, e.g., a miner's hard hat or lantern. The operational concept in each of these applications is the adaptive, interactive projector illumination. In such applications, light is projected onto a scene that is to be illuminated, except in those in which dark areas, i.e., areas with no illumination, are desired. In a military night engagement scenario, for example, the field of engagement can be illuminated with visible or invisible light, while "friendly forces" are simultaneously kept concealed in ambient "darkness." As described above, the feedback necessary to achieve this can be either passive or active, i.e., either passively reflected, or actively projected, from objects in the illuminated scene.

Another such application is tailored to police aerial reconnaissance. A typical scenario might involve, e.g., a police helicopter equipped with a spotlight tracking a squad car or a patrolman on foot in the pursuit of a suspect at night. Again, the scene can be flooded with illumination, while the friendly forces are kept concealed in the ambient darkness. The feedback signal generator can be as simple as a light reflector or a flashlight beacon disposed on the roof of the squad car and/or the patrolman's uniform.

A third application for cooperative AIL floodlighting can be found on the tarmacs of airports. In general, airport tarmac lighting glare is intentionally kept to a minimum to maintain pilot visibility. Although glare from lighting is not considered an issue on the runways, overhead floodlighting near the passenger gates and taxiways is often intense and emitted from several sources. However, a cooperative AIL floodlight system illuminating the tarmac can easily track the cockpit area of a moving airplane, which can be provided with one of many different kinds of reflective or active feedback "beacons," to virtually eliminate the glare of the floodlights on the airplane's cockpit.

Wide-Field-of-View Laser Communications

In addition to non-coherent white light, the DLP 24 of the light projector 16 of FIGS. 2-4 are capable of reflecting coherent, e.g., laser light. In this embodiment, the DLP can act like a "phased-array" laser transmitter. The field of regard (FOR) and resolution of the transmitted coherent beam is determined by the outbound optics 34. Since a typical DLP can comprise approximately 1000 by 800 mirrors 28, each of about 13.7 microns square, a typical individual field of view from each DLP mirror can be about two arc-minutes in a 35 degree composite field of view (FOV). A typical DLP also has a full-frame refresh rate of about 9.6 KHz. This results in an embodiment of an AIL system 10 in which a single, continuous-wave laser light emitter 26 can send several kilobits of data per second over each of the approximately 800,000 individual beams of light 32 projected by the system. Further, a pulsed laser can be used in a known manner to substantially increase that data rate.

Stage Lighting

AIL illumination can also be employed advantageously in the field of film and theater lighting. The technical fundamentals are similar to those previously described. Predetermined levels of illumination, including spectral content, can be generated according to the choreography of the performance, and adaptive illumination can then be superimposed on the scene on a real-time basis to achieve desirable lighting affects. As above, the adaptive illumination communication medium can be generated with either invisible passive reflective elements or active beacons in the stage setting. For example, in one possible application, a number of AIL illumination systems 10 can be utilized to project light onto a set or stage, and the lighting director can be provided with a computer 22 (FIG. 1) that commonly controls the projectors of all the systems. The image processor 20 of the systems can be provided with software that automatically detects and displays the edges, or boundaries, of objects within the lighted scene, such as actors, props and the like. The lighting director can then select respective IFOV's of the illuminated objects, e.g., by pointing at them with the computer's cursor, and apply controlled levels of illumination and color to each of the objects on a real time basis.

In light of the foregoing examples of the many possible advantageous applications of the AIL systems 10 of the present invention, the scope of the invention should not be limited to the particular embodiments illustrated and described herein, as they are merely exemplary in nature, but rather, should be fully commensurate with that of the claims appended hereafter and their functional equivalents.

What is claimed is:

1. Apparatus for adaptively and interactively lighting selected portions of a scene, the apparatus comprising:
   a digital light projector, comprising:
      a multi-spectral light emitter;
      means for spatially separating the light emitted by the emitter into a visible portion and an invisible portion;
      a digital light processor (DLP) optically coupled to the light emitter and operative to:
         modulate the invisible portion of the light with an information signal;
         combine the modulated invisible portion of light with the visible portion of light; and,
         project the combined light onto respective individual fields of view (IFOVs) of a field of regard (FOR) of the projector so as to illuminate the scene in accordance with a control signal applied to the projector;
   a camera disposed adjacent to the projector and operative to:
      detect light passively reflected or actively projected from the illuminated scene;
      demodulate an information signal from the light reflected or projected from scene; and,
      generate signals corresponding to the light detected; and,
   a programmable signal processor coupled to the projector and the camera and operative to:
      receive the signals generated by the camera;
      process the received signals into an information communication signal and a light projector control signal in accordance with a set of instructions programmed therein; and,
      apply the projector control signal to the light projector such that the light projected onto respective ones of the IFOVs of the illuminating FOR of the light projector is controlled in accordance with the instructions.

2. The apparatus of claim 1, wherein the means for spatially separating the light from the emitter comprises a beam splitter or a dichroic filter array.

3. The apparatus of claim 1, wherein the means for combining the modulated invisible portion of light with the visible portion of light comprises a beam combiner.

4. The apparatus of claim 1, wherein the modulated information signal comprises information relating to at least one of the speed, range, boundary, location and identity of the apparatus.

5. The apparatus of claim 1, wherein the demodulated information signal comprises information relating to at least one of the speed, range, boundary, location and identity of an object within the illuminated scene.

6. The apparatus of claim 5, wherein the information is modulated onto an invisible portion of the light reflected or projected from the scene.

7. The apparatus of claim 1, further comprising a light reflector or a light projector disposed on an object in the illuminated scene.

8. The apparatus of claim 7, wherein the light reflector includes means for encoding the light reflected thereby with information.

9. The apparatus of claim 1, wherein the light emitter comprises a light source.

10. The apparatus of claim 9, wherein the light source comprises an incandescent light source.

11. The apparatus of claim 9, wherein the light source comprises a light emitting diode (LED).

12. The apparatus of claim 11, wherein the LED comprises a laser diode.

13. A method for adaptively and interactively lighting selected portions of a scene, the method comprising:
   spatially separating light emitted by a multi-spectral light emitter into a visible portion and an invisible portion;
   modulating the invisible portion of the light with an information signal using a digital light processor (DLP);
   combining the modulated invisible portion of the light with the visible portion of light;
   projecting the combined light onto respective individual fields of view (IFOVs) of a field of regard (FOR) with the DLP so as to illuminate the scene in accordance with a control signal;
   detecting light reflected or projected from the illuminated scene;
   demodulating an information signal from the reflected or projected light;
   generating signals corresponding to the light detected;
   processing the signals into an information signal and a projector control signal in accordance with a set of instructions; and, applying the control signal to the light projector such that the light projected onto the respective TFOVs of the illuminating FOR is controlled in accordance with the instructions.

14. The method of claim 13, wherein the light from the emitter is spatially separated with a beam splitter or a dichroic filter array.

15. The method of claim 13, wherein the modulated invisible portion of light is combined with the visible portion of light with a beam combiner.

16. The method of claim 13, wherein the demodulated information is modulated onto an invisible portion of the light reflected or projected from the scene.

17. The method of claim 13, further comprising disposing a non-visible spectrum light reflector or projector on an object in the illuminated scene.

18. The method of claim 17, wherein the light reflector is adapted to encode the invisible light reflected thereby with information.

19. The method of claim 13, further comprising:

projecting coherent light onto selected TFOVs of the illuminating FOR in accordance with the control signal;

modulating at least a portion of the projected coherent light with an information signal;

detecting coherent light passively reflected or actively projected from the illuminated scene; and, demodulating an information signal from the coherent light reflected or projected from the illuminated scene.

* * * * *